US010225074B2

United States Patent
Gao et al.

(10) Patent No.: US 10,225,074 B2
(45) Date of Patent: Mar. 5, 2019

(54) ENCRYPTION SYSTEM AND METHOD BASED ON BIOMETRIC TECHNOLOGY

(71) Applicant: AMBIT MICROSYSTEMS (SHANGHAI) LTD., Shanghai (CN)

(72) Inventors: Jing Gao, Shanghai (CN); Zheng-Wu Yang, Shanghai (CN)

(73) Assignee: AMBIT MICROSYSTEMS (SHANGHAI) LTD., Shanghai (CN)

(*) Notice: Subject to any disclaimer, the term of this patent is extended or adjusted under 35 U.S.C. 154(b) by 437 days.

(21) Appl. No.: 14/985,703

(22) Filed: Dec. 31, 2015

(65) Prior Publication Data

US 2017/0155503 A1 Jun. 1, 2017

(30) Foreign Application Priority Data

Dec. 1, 2015 (CN) .......................... 2015 1 0858961

(51) Int. Cl.
*H04L 9/06* (2006.01)

(52) U.S. Cl.
CPC ..................... *H04L 9/06* (2013.01)

(58) Field of Classification Search
CPC ........................................ H04L 9/06
USPC ........................................ 380/28
See application file for complete search history.

(56) References Cited

U.S. PATENT DOCUMENTS

| 7,907,723 B2* | 3/2011 | Rubin | H04L 9/06 380/255 |
| 7,912,213 B2* | 3/2011 | Rubin | H04L 9/06 380/255 |
| 2007/0214361 A1* | 9/2007 | Rubin | H04L 9/06 713/168 |
| 2007/0297614 A1* | 12/2007 | Rubin | H04L 9/06 380/285 |

FOREIGN PATENT DOCUMENTS

| CN | 103473733 A | 12/2013 |
| CN | 104734848 A | 6/2015 |

* cited by examiner

*Primary Examiner* — Teshome Hailu
(74) *Attorney, Agent, or Firm* — ScienBiziP, P.C.

(57) ABSTRACT

An encryption method includes: converting a section of express information into a binary sequence, grouping the binary sequence into a plurality of group data, and aligning each group data into an information matrix; converting the information matrix into a corresponding a basic group information matrix; randomly choosing a reference DNA sequence from a gene library, and aligning the reference DNA sequence into a basic group transition matrix, using the basic group transition matrix to convert the basic group information matrix into an encrypted information matrix, and exploding the encrypted information matrix to obtain a basic group information sequence; generating a primer for the basic group information sequence, and adding the primer before and behind the primer generator to obtain a completed DNA sequence; and synthesizing a DNA matter based on the completed DNA sequence.

13 Claims, 8 Drawing Sheets

1010000110110011000011101001110111011101001100101111000111010010000
1110010110010111001101100101110010111001110000111010011011111000001
1000011000000111001111001011110001111010111001011101101100011110010111
0000011011111100110100000011000111101000110000011100010110000111000011111
1010011001011110010111001110000011001101110010110000111101111101111010
0000110011011100101101111111011011000000110000110000001100110110100011101
1101101001111010011001011000000110000111011001110000110100001100000011100
01011001011110100101100100000111001111110101110001111010000100000110000
11110011100000011101001101000110000111101001000000110111111001101000001
10000110000011011101100011110100111010111100101100001110110010000011
0110011000011101110110011111101010111000011100111110010110111101000000100
0101110111011000111110010111100111100001110100110100111011111101111010
000011010011110011100000111010011010001100101100000011100001111001011101
11

| Biological exclusive or | A | C | G | T |
|---|---|---|---|---|
| A | A | C | G | T |
| C | C | A | T | G |
| G | G | T | A | C |
| T | T | G | C | A |

FIG. 6

| 0 | 0 | 1 | 0 | | | | | | | |
|---|---|---|---|---|---|---|---|---|---|---|
| 1 | 1 | 0 | 0 | | | | | | | |
| 1 | 0 | 0 | 1 | | | | | | | |
| 1 | 0 | 0 | 0 | | | | | | | |

FIG. 7

|    | AA   | AC   | AG   | AT   | CA   | CC   | CG   | CT   | GA   | GC   | GG   | GT   | TA   | TC   | TG   | TT   |
|----|------|------|------|------|------|------|------|------|------|------|------|------|------|------|------|------|
| AA | AAGT | GCAA | TGAA | AGGC | CTTG | CCCG | ACCG | TCGG | CATT | TGTA | CGGG | CAAG | TGTG | GGCC | AACG | ATAC |
| AC | TTCA | CCTT | TTAG | CGCG | GGCA | TATG | GGTT | GCGG | ATTT | GCAG | ACTT | GAAT | AGTC | GTCC | GATG | CCCT |
| AG | CACA | GTGA | TAGC | ACAA | TGAC | ATAA | ACCT | CCAG | AGGT | AATA | GTGC | CTAG | CTGT | CAGG | GGAT | AGAG |
| AT | GGTG | TTAC | CCTG | GACA | CAAT | TACC | AAAC | GTTG | AGAC | GAGA | AGCG | CCCC | TAAT | GCGC | TATA | CGGT |
| CA | TGCT | ACGT | TAAA | TCAT | AGTG | CTCT | GCCC | CATG | GATC | CTAC | CAAA | GGTC | ACCC | TGCA | AATG | CCAC |
| CC | CTGA | TCTT | AACC | GACC | CCGA | AATT | CTTC | ACTC | CAGC | ATCA | CGAC | AAAT | CGCA | TCCA | ATTC | GCCT |
| CG | AGAA | GCAT | GGAT | CATA | GGCG | GTAT | TCCG | GCAC | TCCA | ACCA | GCTT | CGGC | ACTA | GTAC | CTCG | ACGG |
| CT | TATC | CTAA | TACA | AGCT | GATT | AAAA | CCGC | ACGA | CCGT | GGGT | GCGC | TCTA | GCTA | TACA | CACT | ATCT |
| GA | GTCA | AACA | GGAG | CAAC | CTGG | ACTG | TGGA | GCGA | TAAC | CGTT | ATGG | TACG | ACAG | TGAC | GACG | TGTC |
| GC | ATGA | TGCG | GAGG | CCCA | CGTG | CTAT | GACT | ATAT | AAGG | GATA | GGCT | ATCC | CGTC | TCGA | CCTC | AATC |
| GG | GTTA | TTCT | ACGC | TCTG | ACAT | TGTT | GAGA | GTAA | GTAT | TAGA | GTAG | GCTG | CTGC | AACT | TAGA | GTTT |
| GT | CACC | TCAA | CGCT | CCTA | CGAG | ATTT | GTGG | CTTA | GAGC | ACAC | CGAT | CTCA | AGAT | GGGC | CCAA | CGCC |
| TA | AGGG | GTGT | GAAG | TCCC | ACTA | TGCC | GGGA | AGCT | TTTT | TCGT | TAGG | TTTA | TTTG | ATAC | TTGC | TGGG |
| TC | TGGT | AAGA | ATGC | GCGT | CATC | TTCT | CTCC | TTAT | GTTC | AGTT | GAGT | TGGC | GAAA | AAAC | GTCG | ACCT |
| TG | GCTC | TTAA | GTCT | TGAG | AGCA | TAAG | GCTA | TATC | CCGG | TTGT | TCTC | AAAG | TTTC | TCAG | CACG | ATTG |
| TT | ATGT | CGGA | TTGA | GGGG | TAGT | CCCA | TTAA | AAGC | TTCC | TCGC | TAAA | GCCA | TGAT | CTTT | AGGA | GGAA |

ENCRYPTION SYSTEM AND METHOD BASED ON BIOMETRIC TECHNOLOGY

CROSS-REFERENCE TO RELATED APPLICATIONS

This application claims priority to Chinese Patent Application No. 201510858961.0 filed on Dec. 1, 2015, the contents of which are incorporated by reference herein.

FIELD

The subject matter herein generally relates to encryption methods and in particular to an encryption method based on biometric technology.

BACKGROUND

When important file is transmitted, it is necessary to encrypt the file. Therefore, unauthorized user can not get the information of the file even the file is revealed.

BRIEF DESCRIPTION OF THE DRAWINGS

Implementations of the present technology will now be described, by way of example only, with reference to the attached figures.

FIG. 4 is a listing of a binary sequence formed from the encryption method.

FIG. 6 is a diagrammatic view of a method of biological exclusive or operation.

FIG. 7 is a diagrammatic view of a method for matrix ranks exchange.

FIG. 8 is listing of a method for basic group information matrix permutation.

DETAILED DESCRIPTION

Figure 1:
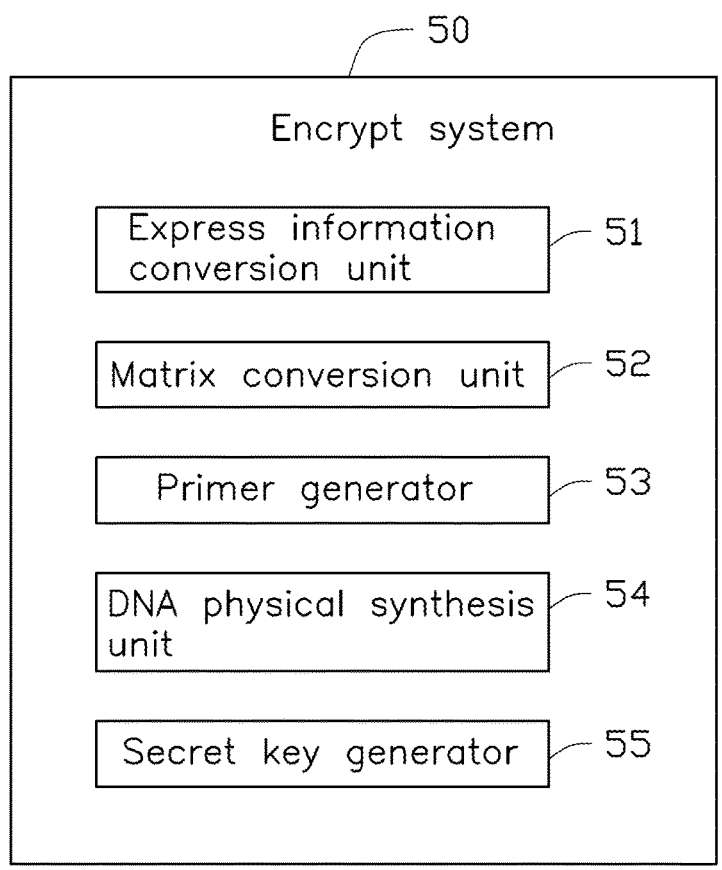
FIG. 1 is a block view of an encryption system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series and the like.

FIG. 1 illustrates an encryption system 50 based on biometric technology comprises an express information conversion unit 51, a matrix conversion unit 52, a primer generator 53, a deoxyribonucleic acid (DNA) physical synthesis unit 54, and a secret key generator 55.

Figure 2:
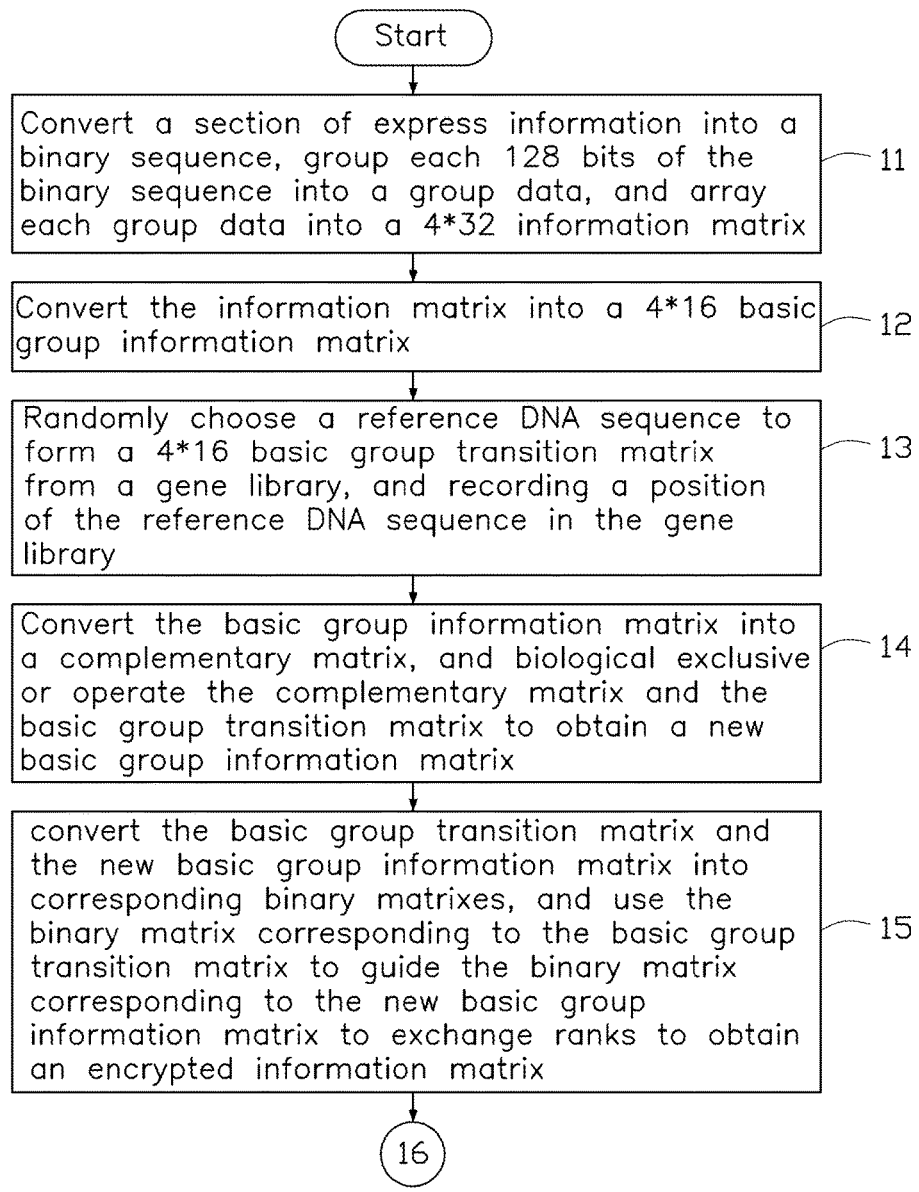
FIG. 2 and FIG. 3 are a flow chart of an encryption method.
Figure 3:
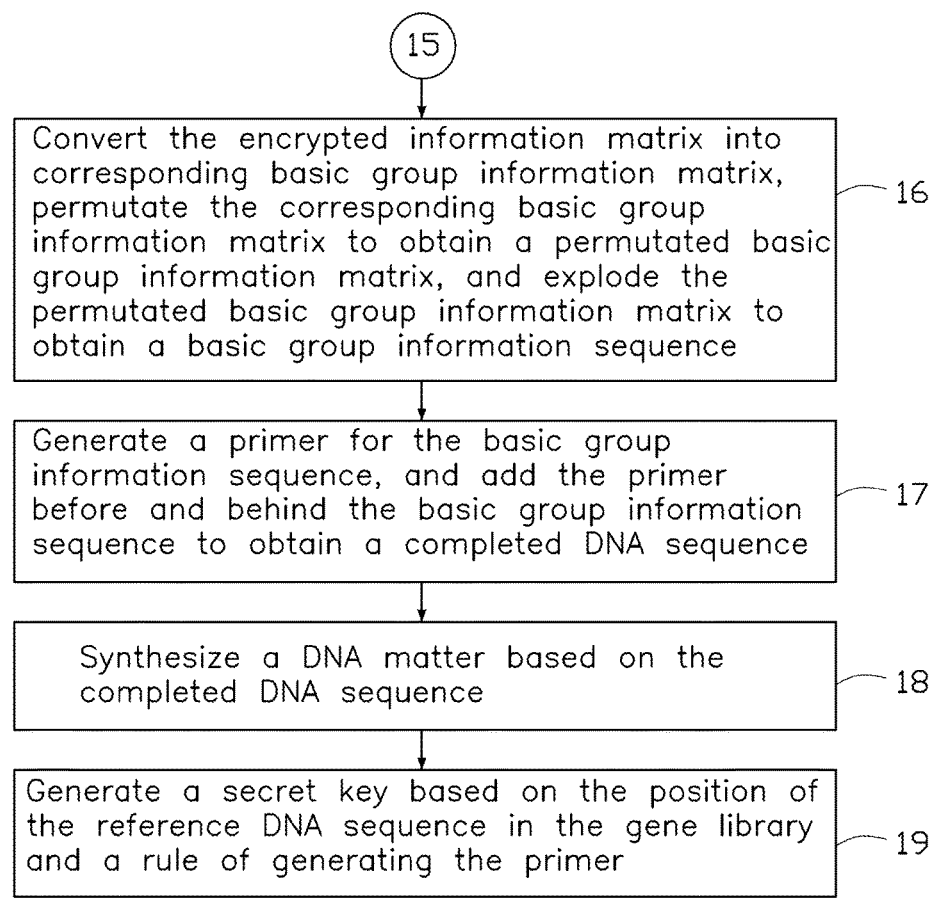

FIG. 2 and FIG. 3 illustrate a flow chart of one embodiment of an encryption method comprising following steps.

Figure 5:
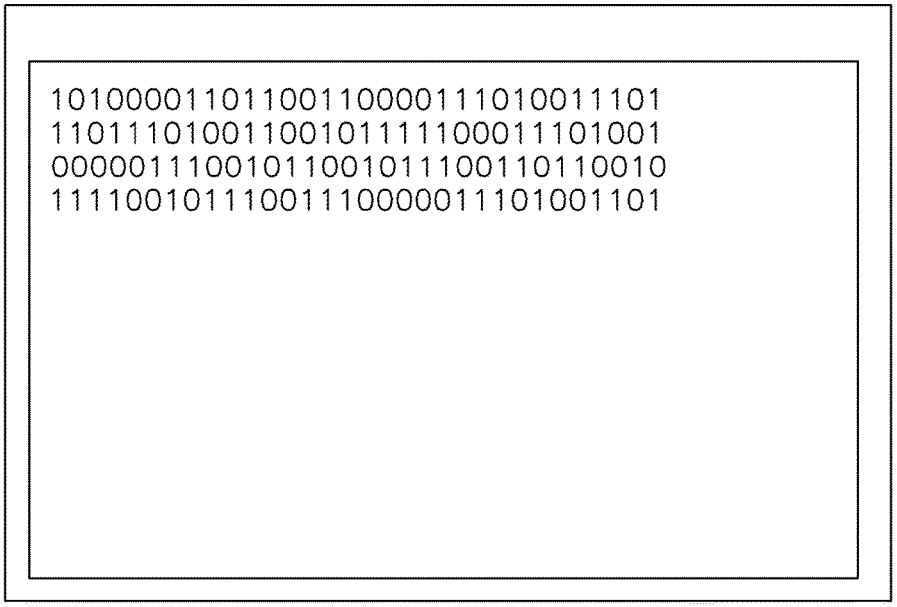
FIG. 5 is a four rows and thirty-two columns (4*32) information matrix.

At block 11, the method comprises the express information conversion unit 51 converting a section of express information into a binary sequence (as shown in FIG. 4) based on Character encoding (such as the American Standard Code for Information Interchange (ASCII) table, or the Extended Binary Coded Decimal Interchange Code (EBCDIC) table), grouping each 128 bits of the binary sequence into a group data (using "0" to complete 128 bits when less than 128 bits is present), and aligning each group data into a four rows and thirty-two columns (4*32) information matrix (as shown in FIG. 5).

At block 12, the method comprises converting the information matrix into a four rows and sixteen columns (4*16) basic group information matrix M0. When converting, a two bit binary number corresponds to a basis group according to DNA encoding, for example the binary number "00" corresponds to a basic group "C", the binary number "01" corresponds to a basic group "T", the binary number "10" corresponds to a basic group "A", and the binary number "11" corresponds to a basic group "G".

At block 13, the method comprises randomly choosing a reference DNA sequence, which has 64 sequential basic groups to form a 4*16 basic group transition matrix M1, from a gene library, and recording a position of the reference DNA sequence in the gene library.

At block 14, the method comprises the matrix conversion unit 52 converting the basic group information matrix M0 into a complementary matrix M01 (the basic groups "C" and "G" are complementary, and the basic groups "A" and "T" are complementary), and biological exclusive or (XOR) operation of the complementary matrix M01 and the basic group transition matrix M1 to obtain a new basic group information matrix M02. The biological XOR operation is based on a table shown in FIG. 6. Biological XOR operation to the basic groups "A" and "A" to get basic group "A", biological XOR operation to the basic groups "A" and "C" to get basic group "C", and the like.

At block 15, the method comprises converting the basic group transition matrix M1 into a 4*32 binary matrix M11, converting the basic group information matrix M02 into a 4*32 binary matrix M02', and the matrix conversion unit 52 uses the matrix M11 to guide the matrix M02' to exchange ranks to obtain an encrypted information matrix M03.

Figure 7:
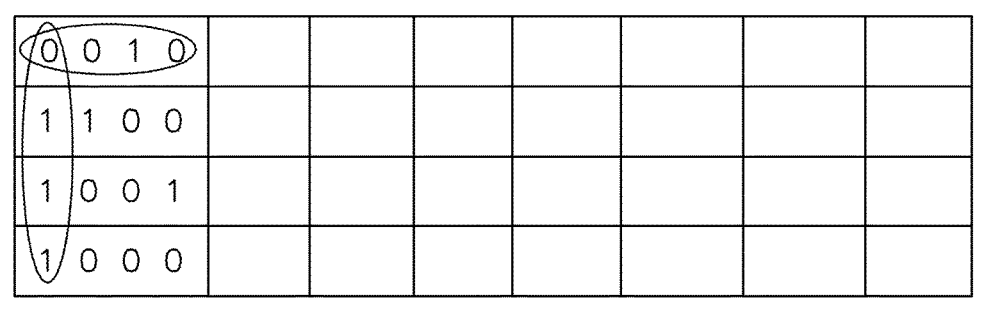

FIG. 7 illustrates when exchanging ranks, the first, second, third, and fourth bits of first row of the matrix M11 are captured to get a four bit binary number, such as "0010" as shown in FIG. 7. The four bit binary number "0010" is divided into "00" and "10", which corresponds to decimal numbers "0" and "2". Then, the "0+1" column (the first column) and the "2+1" column (the third column) of the matrix M02' are exchanged. The first, second, third, and fourth bits of first column of the matrix M11 are captured to get a four bit binary number, such as "0111". The four bit binary number "0111" is divided into "01" and "11", which corresponds to decimal numbers "1" and "3". Then, the "1+1" row (the second row) and the "3+1" row (the fourth row) of the matrix M02' are exchanged. Therefore, the first round conversion is completed. The matrix M11 has 32 columns and 4 rows. Therefore, the matrix M11 can guide the matrix M02' to exchange ranks for 32 rounds. In the n*i (n<=4, i<=8) round conversion, the 4*i-3 bit to the 4*i bits of the n row is captured to guide exchange columns, and four bits of the i column are captured to exchange rows.

At block 16, the method comprises converting the encrypted information matrix M03 into corresponding basic group information matrix M03', the matrix conversion unit 52 permutating the basic group information matrix M03' to obtain a permutated basic group information matrix M04, and exploding the matrix M04 to obtain a basic group information sequence M04.

FIG. 8 illustrates when permutating, to capture in turn four basic groups from the basic group information matrix M03', the first and second basic groups of the four basic groups are transferred to lookup row, and the third and fourth basic groups of the four basic groups are transferred to lookup column. Therefore, a permutation of four basic groups is obtained in the table of FIG. 8 to displace the original four basic groups. Using the above method, the total basic group information matrix M03' is permutated to obtain the new basic group information matrix M04.

At block 17, the method comprises the primer generator 53 generating a primer for the basic group information sequence M04, and adding the primer before and behind the basic group information sequence M04 to obtain a completed DNA sequence. In one embodiment, the primer generator 53 uses the software primer Premier 5.0 to generate the primer based on a preset primer generating rule.

At block 18, the method comprises the DNA physical synthesis unit 54 synthesizing a DNA matter based on the completed DNA sequence.

At block 19, the method comprises the secret key generator 55 generates a secret key based on the position of the reference DNA sequence in the gene library and the preset primer generating rule, and sending the DNA matter and the secret key to a receiver who needs the section of information.

When decrypting, DNA matter is analyzed to obtain the DNA sequence and the section of express information can be obtained from the DNA sequence based on the secret key.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An encryption method comprising:
   converting a section of express information into a binary sequence;
   grouping the binary sequence into a plurality of group data;
   aligning each group data into an information matrix;
   converting the information matrix into a corresponding a basic group information matrix;
   randomly choosing a reference DNA sequence from a gene library;
   aligning the reference DNA sequence into a basic group transition matrix;
   using the basic group transition matrix to convert the basic group information matrix into an encrypted information matrix;
   exploding the encrypted information matrix to obtain a basic group information sequence;
   generating a primer for the basic group information sequence;
   adding the primer before and behind the primer generator to obtain a completed DNA sequence; and
   synthesizing a DNA matter based on the completed DNA sequence.

2. The encryption method of claim 1, further comprising: generating a secret key based on the position of the reference DNA sequence in the gene library and a rule of generating the primer.

3. The encryption method of claim 1, wherein each 128 bits of the binary sequence is divided into a group data, and to use "0" to complete 128 bits when less than 128 bits is present.

4. The encryption method of claim 3, wherein the information matrix is a four rows and thirty-two columns matrix.

5. The encryption method of claim 4, wherein the basic group information matrix is a four rows and sixteen columns matrix, and the binary number "00" of the information matrix corresponds to a basic group "C" of the basic group information matrix, the binary number "01" of the information matrix corresponds to a basic group "T" of the basic group information matrix, the binary number "10" of the information matrix corresponds to a basic group "A" of the basic group information matrix, and the binary number "11" of the information matrix corresponds to a basic group "G" of the basic group information matrix.

6. The encryption method of claim 5, wherein the reference DNA sequence has sequential 64 basic groups, and the basic group transition matrix is a four rows and sixteen columns matrix.

7. The encryption method of claim 1, wherein the step of using the basic group transition matrix to converting the information matrix to obtain an encrypted information matrix comprises: converting the basic group information matrix into a complementary matrix, and biological exclusive or operating the complementary matrix and the basic group transition matrix to obtain a new basic group information matrix.

8. The encryption method of claim 7, wherein the step of using the basic group transition matrix to converting the information matrix to obtain an encrypted information matrix further comprises: converting the basic group transition matrix and the new basic group information matrix into corresponding binary matrixes, and using the binary matrix corresponding to the basic group transition matrix to guide the binary matrix corresponding to the new basic group information matrix to exchange ranks to obtain an encrypted information matrix.

9. The encryption method of claim 8, wherein the step of using the basic group transition matrix to converting the information matrix to obtain an encrypted information matrix further comprises: converting the encrypted information matrix into corresponding encrypted basic group information matrix, and permutating the encrypted basic group information matrix to obtain a permutated basic group information matrix, and exploding the permutated basic group information matrix to obtain the basic group information sequence.

10. An encryption system, the system comprising:
    at least one processor;
    a non-transitory storage unit; and
    one or more programs that are stored in the non-transitory storage unit and executed by the processor, the one or more programs comprising instructions for:

converting a section of express information into a binary sequence, grouping the binary sequence into a plurality of group data, and aligning each group data into an information matrix;

converting the information matrix into a corresponding a basic group information matrix, using the basic group transition matrix to convert the basic group information matrix into an encrypted information matrix, and exploding the encrypted information matrix to obtain a basic group information sequence;

generating a primer for the basic group information sequence, and adding the primer before and behind the primer generator to obtain a completed DNA sequence; and synthesizing a DNA matter based on the completed DNA sequence.

11. The encryption system of claim 10, wherein a reference DNA sequence is randomly chosen from a gene library, and the basic group transition matrix is aligned from the reference DNA sequence.

12. The encryption system of claim 11, wherein the primer generator generates the primer based on a preset primer generating rule.

13. The encryption system of claim 12, further comprising a secret key generator, wherein the secret key generator generates a secret key based on the position of the reference DNA sequence in the gene library and the preset primer generating rule.

* * * * *